US006962545B2

(12) United States Patent
Larkin

(10) Patent No.: US 6,962,545 B2
(45) Date of Patent: Nov. 8, 2005

(54) MULTI-RANGE PARALLEL-HYBRID CONTINUOUSLY VARIABLE TRANSMISSION

(75) Inventor: Robert P. Larkin, Lee, MA (US)

(73) Assignee: BAE Systems Onctrols, Johnson City, NY (US)

( * ) Notice: Subject to any disclaimer, the term of this patent is extended or adjusted under 35 U.S.C. 154(b) by 0 days.

(21) Appl. No.: 10/668,485

(22) Filed: Sep. 22, 2003

(65) Prior Publication Data

US 2004/0058769 A1 Mar. 25, 2004

Related U.S. Application Data

(60) Provisional application No. 60/412,257, filed on Sep. 23, 2002.

(51) Int. Cl.$^7$ ................................................. F16H 3/72
(52) U.S. Cl. .......................................................... 475/5
(58) Field of Search ............................ 475/5, 323, 325; 477/3–5; 180/65.2–65.4

(56) References Cited

U.S. PATENT DOCUMENTS

| | | | |
|---|---|---|---|
| 4,588,040 A | | 5/1986 | Albright, Jr. et al. |
| 4,815,334 A | | 3/1989 | Lexen |
| 5,120,282 A | | 6/1992 | Fjallstrom |
| 5,177,931 A | | 1/1993 | Latter |
| 5,577,973 A | * | 11/1996 | Schmidt ........................... 475/5 |
| 5,603,671 A | * | 2/1997 | Schmidt ........................... 475/5 |
| 5,935,035 A | * | 8/1999 | Schmidt ........................... 475/5 |
| 6,455,947 B1 | | 9/2002 | Lilley et al. |
| 6,491,599 B1 | * | 12/2002 | Schmidt ........................... 475/5 |
| 6,551,208 B1 | * | 4/2003 | Holmes et al. .................. 475/5 |
| 6,592,484 B1 | | 7/2003 | Tsai et al. |
| 2003/0064854 A1 | * | 4/2003 | Kotani ............................ 477/3 |
| 2004/0180751 A1 | * | 9/2004 | Heitmann et al. ............ 475/284 |

* cited by examiner

*Primary Examiner*—Roger Pang
(74) *Attorney, Agent, or Firm*—William H. Meise; Geoffrey H. Krauss

(57) ABSTRACT

A parallel-hybrid transmission has one or more electrical motor/generator units, at least one of which moves in an anti-engine-wise direction in certain operational modes. The motor/generators are coaxially or concentrically arranged with the transmission input and output shafts via planetary gear sets. Associated clutch closures selectively couple power to and from the sun gears and planetary carriers of the gear sets through a complex planetary gear configuration such as a Ravigneaux gear set, for switching between certain operational modes. The clutch and brake operations selectively achieve multiple ratio range operations including engine starting under electric power, high torque acceleration from a standstill, regenerative deceleration (braking), multiple ratio range operation, load sharing, rotation-matched step-less shifting and combined or individual continuously variable combustion engine and electric motor and/or generation modes.

14 Claims, 6 Drawing Sheets

MULTI-RANGE PARALLEL-HYBRID CONTINUOUSLY VARIABLE TRANSMISSION

CROSS REFERENCE TO RELATED APPLICATION

This application claims the priority of U.S. Provisional Patent Application Ser. No. 60/412,257, filed Sep. 23, 2002.

FIELD OF THE INVENTION

The invention relates to multiple-ratio range continuously-variable transmissions, for example for use with electric motor/generator units in combination with internal combustion engines, typically for motor vehicle drive trains.

BACKGROUND OF THE INVENTION

Arrangements using multiple sources of power for vehicles, such as electric motor and internal combustion-powered vehicles, often have aspects that fall into one of two general categories, namely those in which the power sources are serially arranged, and those in which they are at least partly parallel. A multiple or hybrid power source, for example, may comprise an internal combustion engine and one or more electric rotating machines operable as motors or as generators in different conditions. These power sources may drive one another serially, or may contribute concurrently (in parallel) to driving the same output shaft.

In a series configuration, a prime mover such as an internal combustion engine powers an electrical generator. The electrical energy thus developed is conditioned by an electrical control unit and subsequently delivered to an electric motor. The electric motor is mechanically connected to apply power to the mechanical driving elements of the vehicle.

A power system as described also may have an associated energy storage means such as a set of storage batteries. The energy storage means can be tapped when needed to provide electric power to the vehicle in addition to the power being produced from the generator. The energy storage means also can be used to store regenerated electrical power collected during braking, e.g., by selectively operating the driving electric motor as a generator, or perhaps using a separate generator. When charged, the energy storage means may provide all the power used to move the vehicle, but only for a limited time and perhaps at reduced performance levels. Similar energy recovery advantages as well as similar alternatives in routing of electrical and mechanical energy can be useful In some instances without relying substantially on storage batteries, for example as in the case of locomotives, where an internal combustion engine may power a generator that is coupled to an electric motor for the purpose of achieving high torque at low speed for starting.

A serial system as described can be effective, particularly for reclaiming vehicle energy by regeneration. One drawback that is inherent in the configuration, however, is that the electric machine(s) that finally couple to the driving elements, determine the limits of performance of the vehicle. For example, the maximum power output developed by the electric motor ultimately determines the maximum acceleration of the vehicle. The electric motor must be specified for sufficient starting torque, steady state loading, with associated heat dissipation capacity and the like, to meet vehicle performance requirements.

In a parallel configuration, mechanical drive is coupled to the driving elements from both the prime mover (e.g., an internal combustion engine) and also from one or more electric motors powered from a generator and/or energy storage means. This combining of available power from two sources is accomplished through a transmission. In such a configuration, both the prime mover and the electric motor can be called upon when needed and their contributions to performance are added. Therefore, a parallel system and a serial system that can achieve a given performance level may differ in that the parallel system uses smaller motors, generators and engines than the serial system to achieve that performance level. This can have a number of positive effects, such as reduced inertial mass, potentially lower energy storage requirements, reduced atmospheric emissions, etc. In a parallel system, the two or more parallel engines, motors and/or generators, can be controlled to contribute differently in different situations, by sequencing, combining and selecting the manner in which the components are coupled to one another and/or to the driving wheels at any given time. Various efficiencies become available.

In such a combined or hybrid unit, a source of mechanical power such as an internal combustion engine, is coupled to a mechanical load that sometimes functions as a regenerative source of power. That mechanical source and load (the load being a source during regeneration) is coupled to at least one electric machine that can likewise can be made to function as a load (during generation of electric power) or as a source when converting electric power to mechanical power. These different functional states of the mechanical and electrical elements provide a number of efficiencies in which mechanical and/or electric power is routed in one direction or another.

Although power may be routed differently, in all the arrangements wherein the internal combustion engine and the rotating electric machine(s) are operating, they conventionally all rotate exclusively in their forward direction. It is possible that a gearing change or vehicle direction can involve a change of direction, such as to move the vehicle in reverse, in which case that direction is the normal operational direction. It is possible to accommodate a specific gearing arrangement through a pair of meshing gears that coupled elements may normally rotate in opposite directions such that the "normal" direction of the engine might correspond to a normal motor/generator direction in on rotational direction or the other. Nevertheless, the "normal" directions of the engine and respective motor/generators are the same in each of the respective operational states of a conventional hybrid apparatus.

For example, the combustion engine could be charging the batteries through an electric generator, or the electric motor/generator could be operating as a motor to add to the mechanical power output by the engine, or the motor/generator might be regeneratively rotated as a generator when recovering vehicle inertia during braking. In each of these situations, the rotating elements conventionally move in their normal rotational direction. This direction is said to be the "engine-wise" direction in this description. The normal or engine-wise direction does not change when power is routed differently. The change in power routing simply concerns which of the devices is producing energy as a source and which is receiving energy as a load.

Parallel-hybrid vehicle transmissions have the capability to couple power from one or more elements functioning as power sources to one or more elements functioning as loads. For example, combustion engine and electric power sharing of this sort can be accomplished by positioning an electrical motor physically between the engine and an existing transmission such that the electric power is additive to the engine power. Assuming that one engine or motor is in line with a driving shaft, the other can be displaced laterally and arranged so that two separate power inputs are supplied. Alternatively, a separate generator can be driven by the engine to power the motor through an electrical circuit, i.e., the arrangement comprising an engine and two electric machines, one normally operating as a motor assisting the engine and the other normally operating as a generator.

Electric machines are operable as motors or as generators depending on whether power is to be collected or expended. Thus power from an engine and a motor can be added together and coupled to the drive wheels. An electric motor can be operated as a generator during braking to recover power. A combustion engine can operate a generator to charge batteries when more engine power is available than is needed for the drive wheels. The battery power can be coupled to one or more electric machines, etc. In the case of two electric machines that may be operated as motors or generators and coupled electrically to a battery, a combustion engine, and the potential to recover inertial energy regeneratively from the drive wheels, including different proportionate contributions of the power sources and the power loads for different conditions, a great deal of flexibility is provided.

Traditional vehicle transmission technology seeks to couple a single power source such as a combustion engine to a single load such as a driveshaft that moves surface-engaging wheels supporting the vehicle. A primary object is to operate the engine over a range of speeds that the transmission converts into different speed/torque combinations at the load. A dual motor/generator parallel-hybrid powertrain system may seek to achieve similar speed/torque combinations at the load, but to do so in a different way, for example wherein the combustion engine is operated at a relatively limited range of speeds where it is most efficient. A conventional transmission (manual or automatic) may be a step-ratio device, having discrete fixed ratios of input speed to output speed, i.e. first gear, second gear, etc.

Another known transmission type is the continuously-variable transmission, or CVT. These transmissions have a minimum low numerical ratio, a maximum high numerical ratio, but continuously variable ratios between these limits. The capability of a continuously variable transmission to assume any gradation of ratios, within limits, can be applied to a dual motor/generator parallel hybrid configuration, where such gradations can be factored into the power sharing arrangements between the components. Hybrid vehicles including the Honda Insight and Toyota Pruis are parallel-hybirds with CVT transmissions.

Small hybrid automobiles may use, for example, a Van Doorne belt CVT configuration, which may be effective for smaller vehicles but is less applicable to large vehicles such as trucks, that need a wide range of ratios for adequate torque multiplication. Providing a ratio adapted for high torque at low speed adversely affects maximum speed characteristics to the point that one "ratio range" may be insufficient. It would be advantageous in those situations to provide successive ratio ranges, i.e., first range, second range, etc.

Multi-range CVT transmissions have been produced on a limited basis, including the Cummins-Sunstrand responder of the early 1970's (a two-range hydromechanical CVT), the HMPT 500 tracked vehicle transmission of the U.S. Army (a three-range hydromechanical example). Four range CVT prototypes have been developed, and hydromechanical CVT agriculture tractors are known. These multi-range hydrostatic powered transmissions set the example for parallel-hybrids.

Recent developments in multi-range CVT parallel-hybrid transmissions have their lineage in hydrostatic drive transmissions as mentioned, but there are differences. One difference is on-board energy storage and switching arrangements whereby two or more electric machines in a hybrid can function as motors or generators, and together with the engine can provide power simultaneously. Since the motor and pump of a hydrostatic device are integrally linked through fluid connections, they cannot provide for separate power inputs or function at different power levels at the same time.

A transmission for automotive applications must be placed in the vehicle without intruding on passenger space or compromising other aspects of design. The mounting position of the major rotating components is a concern, and it may be advantageous to place them in line, on the same axis. A parallel-hybrid transmission based upon a hydromechanical configuration may require a dual axis (at a minimum) with either the hydrostatic input or the mechanical input (or lay shaft) displaced from the center line. Such arrangements are at a disadvantage as to compactness and may require substantial complexity to realize.

Over the variation of possible vehicle size, from subcompact car to large industrial truck, there may be a number of possible mounting and mechanical arrangements possible. However, it would be advantageous if a wide range of sizes could be accommodated using a coaxial or even concentric arrangements where efficiencies can be realized using at least one power source such as a combustion engine and at least one electric machine that can function at least at times in different states as a motor or generator controlled by switching controls to effect different operations.

What is needed is a parallel-hybrid transmission having size/shape and power delivery capabilities comparable to current automatic transmissions, that contributes to the requirements of a hybrid arrangement and enables exploitation of the hybrid's particular advantages.

SUMMARY

A transmission and power train configuration includes two separately controlled electric rotating machines (i.e., motor/generator units) together with a prime mover such as an internal combustion engine capable of producing torque and speed.

A first motor/generator unit is connected through a controllable clutch device and can be driven by the engine through a first planetary gear set. A second motor/generator unit drives a third planetary gear set configuration through a secondary planetary gear set in such a manner as to alter the power parameters of the second motor/generator unit. The third planetary gear set configuration—which may be treated as a compound gear set in a proscribed manner—is selectively controlled through the selective application of clutch and brake devices to achieve three forward ratios ranges, and one in reverse. The respective engine and motor/generator units thereby achieve necessary vehicle movement functions, and the output operations are continuously variable with respect to transmission inputs. The unit is shiftable in a synchronous manner between ratio ranges and modes.

Apart from the number of motor/generator electric machines used, another aspect of the invention is that at least one motor/generator in at least one operational mode is moved in an anti-engine-wise direction to achieve certain objectives. These objectives can include but are not limited to regeneration of electric energy in some modes, speed regulation for purposes of operation at efficient speed ranges, and speed matching of rotating elements for achieving step-less changes in modes of operation at matched rotational speeds.

Furthermore, the hybrid transmission according to an aspect of the invention provides for selective and individual control of the two motor/generator units to provide for routing power in different directions for different situations, including the capability of starting the internal combustion engine using power from one or both motor/generators, battery charging from the engine, regenerative braking during deceleration so as to extract power from vehicle inertia, alternating driving/generating capability during normal operation, load sharing and multiple input capability during certain operations as well as selection of power sources based on various factors, etc. The invention provides a high degree of flexibility with corresponding benefits in vehicle capabilities and improved vehicle efficiency.

BRIEF DESCRIPTION OF THE DRAWINGS

The accompanying drawings are incorporated in and constitute a part of this specification, and illustrate several embodiments and examples that together with their description, serve to explain the principles of the invention, and wherein:

FIG. 1a is a schematic diagram of a parallel-hybrid transmission structured in accordance with one embodiment of the present invention;

FIG. 1b is a lever analogy diagram representing the planetary gear sets in the transmission embodiment of FIG. 1a;

Figures 1A, 1B:
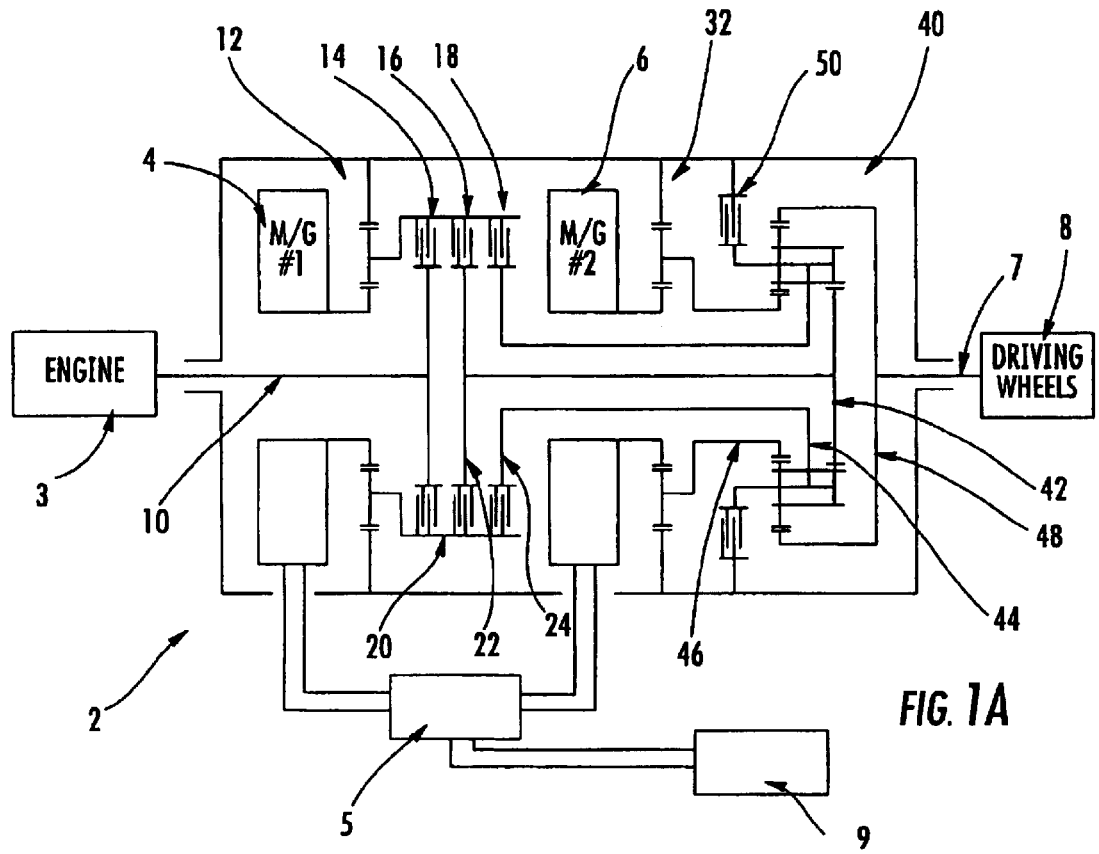

The schematic diagrams of the transmission embodiments in FIG. 1b–FIG. 9b have been simplified by omitting redundant depiction of the lower halves of the transmission elements, which are substantially symmetrical as shown in FIG. 1a. The same reference numerals have been used throughout the several view of the drawings to refer to the same or comparable elements in the respective embodiments and illustrations.

DETAILED DESCRIPTION OF THE PREFERRED EMBODIMENTS

Referring to FIG. 1a illustrating a first embodiment of the present invention, a multi-range parallel-hybrid continuously variable transmission, generally indicated by reference number 2, includes an input shaft 10 receiving power from a prime mover 3 to the transmission 2. The prime mover can be an internal combustion engine or another device capable of imparting rotational power to shaft 10. A first electrical motor/generator unit 4 (labeled M/G #1) is concentrically located relative to the input shaft 10 such that the input shaft passes through the first motor/generator 4. The first motor/generator is capable of generating and receiving power and operates in either a clockwise or counterclockwise rotational direction.

A first planetary gear set 12 has its sun gear connected to the rotating rotor of the first motor/generator unit (4). The rotor speed of rotation is increased when driven by the planet gear carrier of the first planetary gear set, when the ring gear of the gear set is fixed mounted to the transmission case. In the embodiment shown in FIG. 1a, the input shaft 10 passes through the sun gear of planetary gear set 12.

A first clutch device 14 is operable to connect the carrier of the first planetary gear set to the input shaft 10. When the clutch 14 is energized, the rotor of the first motor/generator unit (M/G #1) will rotate at a faster speed than the input shaft 10. The planet carrier of the first planetary gear set 12 rotates at the same speed as input shaft 10, which is the engine speed assuming that the engine 3 is coupled directly to shaft 10 without a change of ratio.

The planetary carrier of the first planetary gear set 12 is fixed relative to an outside member 20, which can be a common housing for first clutch device 14 and also second and third clutch devices 16 and 18, respectively. The outside clutch member 20 rotates at the same speed and direction as the planet carrier of the first planetary gear set 12. Such speed and direction of the member 20 is the same as input shaft 10 provided that the first clutch device 14 is energized. The inside member 22, i.e. hub, of the second clutch device is 16 is fixed relative to the rear most sun gear 44 of the third planetary gear set 40. The inside member 24 (hub) of the third clutch device 18 is fixed relative to the planet gear carrier 44 of the third planetary gear set 40. In the embodiment shown, both connections of the second and third clutch devices to the third planetary gear set are accomplished by concentric shafts mounted on the same rotating axis as the input shaft 10, with the concentric shafts passing through the axis of the second motor/generator unit 6 (labeled M/G #2).

In the illustrated embodiment, parts that are fixed relative to one another are understood to be attached in a manner that causes them to rotate together. Such parts may be directly connected as suggested in FIG. 1a or may be coupled through other elements (not shown) whereby they are rotationally fixed or are caused to rotate at the same time and/or at synchronous rotational speed.

A second planetary gear set 32 has its sun gear connected to the rotating rotor of the second motor/generator unit 6. The planet gear carrier of the second planetary gear set 32 is fixed relative to the innermost sun gear 46 of the third planetary gear set 40 such that speed and direction of the carrier and sun gear are identical. The ring gear of the second planetary gear is fixed mounted to the transmission case. The second motor/generator 6 is capable of generating and receiving power in both a clockwise and counter clockwise rotation. By the action of the second planetary gear set 32, the rotor speed of rotation of M/G #2 will be reduced such that the planet gear carrier speed of planetary gear set 32 hence the speed of the inner-most sun gear 46 of third planetary gear set 40 are less than the rotor speed of the second motor/generator 6. The second motor/generator 6 is also concentric to the transmission input shaft 10.

The third planetary gear set 40 is a complex planetary gear arrangement, preferably of the type generally known by those skilled in the art as a Ravigneaux gear set. This arrangement 40 compromises outermost and innermost sun gears 42 and 46, respectively, a planet gear carrier 44, with interconnecting long and short planet gears, and a ring gear 48. As previously stated, the innermost sun gear 46 is fixed relative to the carrier of second planetary gear set 32. The outermost sun gear 42 is fixed relative to the second clutch device 16. The planet gear carrier 44 of the Ravigneaux gear set is connected to the third clutch device 18.

The ring gear 48 of the Ravigneaux gear set 40 is fixed relative to the output shaft 7 of the transmission. In FIG. 1a the output shaft is shown as coupled to the drive wheels 8, but this connection may be indirect through additional components. Nevertheless, the planetary gear sets and motor/generators as shown in FIG. 1a are individually and collectively concentric with the input and output of transmission 2.

The planet gear carrier 44 of the Ravigneaux gear set 40 comprises the inner member (i.e. hub) of a brake device 50. The outer member of brake device 50 is fixed relative to the transmission case. When energized, brake device 50 rotationally locks the planet gear carrier 44 of the Ravigneaux gear set 40 to the transmission case such that the rotation of the gear carrier 44 is prevented. Brake device 50 is similarly concentric with the input and output of the transmission.

In operation, the invention is capable of summing and splitting power from the prime mover or engine 3 and one or both of the motor/generator units 4 and 6, such that multiple power paths are developed within the transmission and are selectable. Power can be delivered to the output shaft 7, as a continuous and step-less flow of power that operates the drivetrain 8 of the vehicle. The multiple power paths are attained in infinitely variable ratio ranges, by varying the direction and loading of the two motor/generator units, either individually or jointly, and either functioning as motors or generators. This is accomplished in part by energizing and de-energizing the clutches 14, 16, 18 and brake 50 in a rational manner as will be described herein. In the preferred embodiment, the respective selections comprise three forward ratio ranges, one reverse ratio range, a neutral or no-power transmission capability. A high torque static start condition is provided in both forward and reverse.

In addition, the transmission can propel the vehicle without the engine 3 running—the duration of such operation being limited by the capacity of the on-board energy storage system 9. Initial engine start capability is also provided by the transmission, namely by energizing the first clutch device 14 and first motor generator 4 in the direction of rotation suitable for starting the engine 3.

Referring to FIG. 1B, the schematic diagram of the preferred embodiment as shown in FIG. 1A is represented in a condensed lever analogy diagram, such technique being published as SAE910958 (1991), Society of Automotive Engineers, Inc., Howard L. Benford et al., "The Lever Analogy—A New Tool in Transmission Analysis", pp. 1–8. According to this technique, a planetary gear set at rest is analogously represented by a vertical line resembling a lever, with the sun gear, ring gear and gear carrier being represented as points on this line, relatively positioned in accordance with the numbers of sun gear and ring gear teeth, i.e., the gear ratio. Similarly, a Ravigneaux gear set arrangement can be represented as a vertical line with both of its sun gears, the ring gear and its carrier represented as points on the vertical line (lever) of the lever analogy. In the arrangement as shown in FIG. 1b, the sun gears of the first and second planetary gear sets 12, 32 are shown fixed relative to the rotating rotors of the first and second motor/generator units 4, 6, respectively. The outermost sun gear 42 of the Ravigneaux gear set 40 is connected to the second clutch device 16. The planet carrier member 44 of the Ravigneaux gear set 40 is connected to the third clutch device 18. The innermost sun gear 46 of the Ravigneaux gear set 40 is connected to the carrier of the second planetary gear set 32. The ring gear 48 of the Ravigneaux gear set 40 is similarly connected to the output shaft 7 of the transmission. As stated above, descriptions of parts that are "connected" in this manner, describes a sufficient coupling to achieve synchronous or similarly related rotation, and is not limited to direct affixation but also can encompass couplings through intermediate elements or through elements that are operable to make and break the pertinent coupling at different times or in different conditions.

The carrier member of the first planetary gear set 12 is connected, i.e., fixed relative to, the external member 20 of the first, second and third clutch devices (14, 16, 18). The carrier member of the Ravigneaux gear set 44 is connected (fixed relative to) the internal member of brake device 50.

The ring gears of both the first and second planetary gear sets 12, 32 are fixed relative to the transmission case, and as a result, rotation of the rotors of either M/G #1 (4) or M/G #2 (6) results in relatively reduced speed rotation at their respective planetary carrier members of planetary gear sets 12, 32. In accordance with the methodology of the lever analogy, such magnitude and direction of rotation can be represented as a vector. The length of the vector is the magnitude, i.e., relative rotational speed. The direction is input-wise to the right; and anti-input-wise to the left.

Thus, for the remainder of this discussion, a right-hand vector is considered analogous to engine rotation in a direction consistent with forward propulsion of the vehicle. Of course, whether the wheels 8 and the engine 9 are in fact physically aligned in the same way could be changed by intermediate gearing and arbitrary definitions could be applied, for example, as to which way is "forward." Nevertheless, the analogy is useful for comparing the relative rotational directions and changes in relative rotation of the respective elements. The ring gears of the first and second planetary gear sets are fixed (non-rotating), and in the lever analogy function as a pivot point for the magnitude and direction of rotation measures of other members of their respective planetary gear sets.

In the Ravigneaux gear set 40, both the second and third clutch devices 16, 18, as well as the brake device 50, affect the several members of this gear set. The ring gear is rotationally fixed relative to the output shaft.

Figure 2:
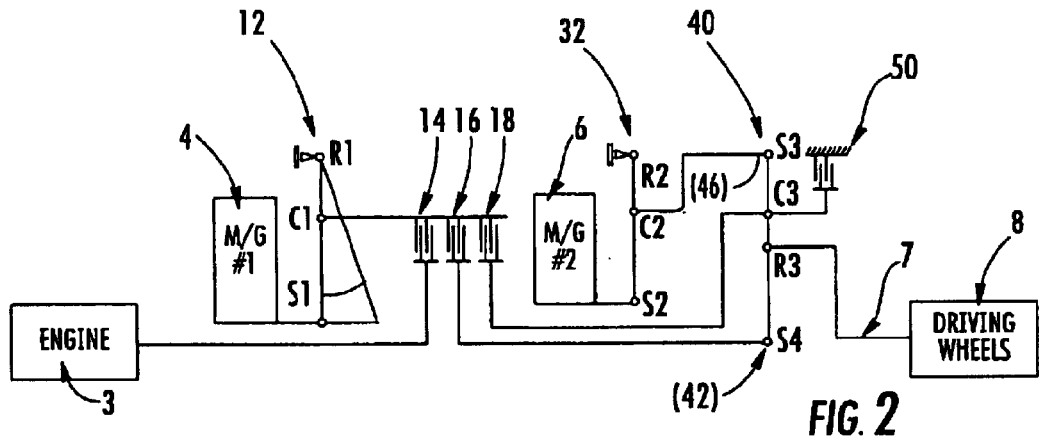
FIGS. 2–8 are lever analogy diagrams providing graphic analyses of the transmission operation in each of multiple transmission ranges.

FIG. 2 illustrates the engine start, electrical charging, and neutral (no transmission output) operating conditions. For purposes of illustration in this and subsequent figures, the members of each planetary gear set will be subscripted in their order of mention. Therefore, the sun gear, planet gear carrier and ring gear of the first planetary gear set 12 will be annotated at S1, C1, and R1 respectively. Similarly for the second planetary gear set 32 these parts are designated S2, C2 and R2. The Ravigneaux planetary gear set 40 has innermost sun gear 46 designated S3, with the carrier and ring gear subscripted as C3 and R3 respectively. The outermost sun gear 42 is identified as S4.

Referring again to FIG. 2, and following the technique of the lever analogy, the right hand vector shown at S1 is representative of the speed and direction of the rotor of the first motor/generator unit 4. Consequently, since ring gear R1 is fixed to the transmission case and is non-rotating, the speed of carrier C1 is proportionally reduced. If the first clutch device 14 is energized, the speed and direction of rotation of C1 will be transferred to the engine 3 to enable it to rotate and start. In this operating condition, M/G #1 (4) is functioning as a motor, i.e., converting electrical energy to mechanical energy, namely voltage and current to torque and rotational speed. Once the engine 3 is running, power from the engine drives M/G #1 through the first clutch device 14 and carrier C1. In this operating condition, M/G #1 is functioning as a generator, i.e., converting speed and torque into electrical energy. When starting, switching of power for delivery through first motor generator 4 is addressed by the controller 5 from the electrical energy stored device 9, shown in FIG. 1a. In the first case, stored electrical energy is used to start the engine. In the second case, such electrical energy as generated by M/G #1 and can be stored in device 9.

In FIG. 2, clutch devices 16 and 18 are not energized. Thus, no energy from either M/G #1 or the engine is transmitted to the Ravigneaux gear set 40. Similarly, M/G #2 is quiescent, and brake device 50 is also not energized. Hence no power is delivered through output shaft 7 to the vehicle drive train 8. This condition represents a neutral or non-propulsion operating condition, during which the engine can be started from M/G #1, and after that can charge the storage batteries 9 through M/G #1, but does not move the vehicle.

Figure 3:
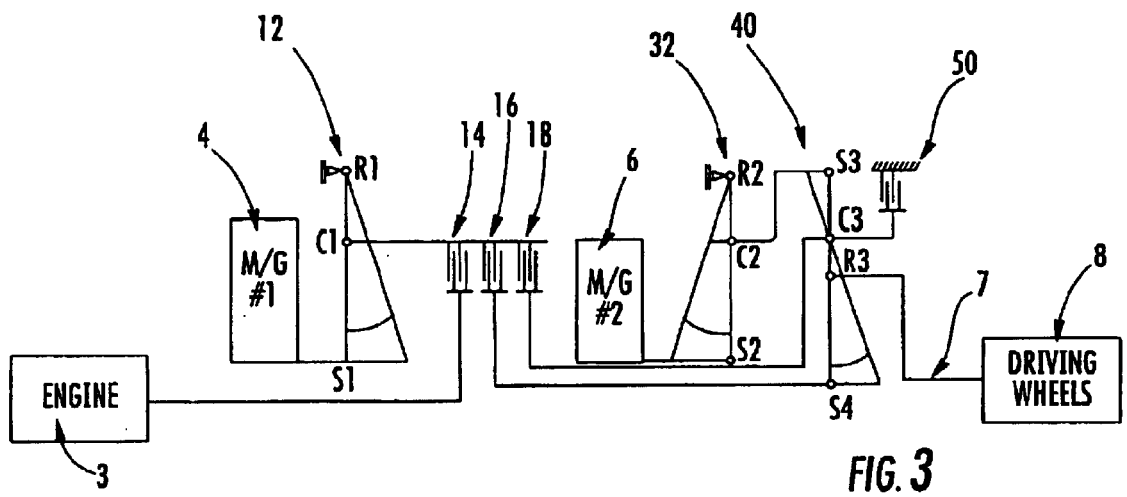

FIG. 3 demonstrates transmission operation in a first ratio range. Starting from the neutral condition as represented by FIG. 2, brake device 50 is energized such that carrier C3 is fixed relative to the transmission case and cannot rotate. Then, M/G #2, which was previously quiescent, is operated as a motor and causes sun gear S2 to rotate in an anti-engine-wise rotation direction, as depicted by the left handed vector at sun gear S2 in FIG. 3. Ring gear R2 is fixed to the transmission case, and in the lever diagram serves as a pivot point in the lever representation of the second planetary gear set, which is inclined in a clockwise manner about pivot point R2. Such action by M/G #2 similarly causes carrier C2 to also rotate in an anti-engine wise rotation as S3, but at a reduced rotational speed proportional to the vertical distance between point R2 and C2, versus R2 and S2. Such proportionality is representative of the gear ratio of planetary gear set 32, which is an unvarying inherent parameter of gear set 32.

Since carrier C2 is fixed connected to sun gear S3, the vector magnitude and direction of C3 is transmitted directly to sun gear S3. As shown in the lever analogy for the Ravigneaux gear set 40, such action at sun gear S3 causes the lever to pivot anti-clockwise about carrier C3 as caused by the energizing of brake device 50. In accordance with the lever analogy technique, all points along a lever translate linearly. Therefore, the rotation of ring R3 becomes an engine-wise rotation as shown by the right hand vector at point R3 on the lever. Sun gear S4 has a similar rotational direction but a greater magnitude (rotational speed). Since ring gear R3 is fixed connected to output shaft 7, and hence to the vehicle drive train 8, the vehicle operates in a forward direction.

Through the connection of carrier C2 to ring gear S3, it can be seen that the speed of ring gear R3, and subsequently the speed of the vehicle, is directly proportional to speed (and direction) of the second motor generator (M/G #2). Considering that M/G #2 has an operating range from zero speed to some maximum speed, it similarly holds that the speed range of ring gear R3 has a maximum speed. The maximum speed is a function of the gear ratios of planetary gear sets 32 and 40. This first ratio range of speeds as discussed above is independent of any rotational contribution from engine 3. The output speed is continuously variable due to variable speed operation of M/G #2, and not rotation of the engine. The engine normally is rotating, however, but in the different modes of operation need not be running or could be running only to charge the storage device though the other motor/generator M/G #1.

If clutch 14 is energized, the engine is connected rotationally to M/G #1, which can be generating electrical energy. By directing this energy through controller 5, electrical power generated from M/G #1 can be delivered to M/G#2 as a motor, while minimizing or eliminating dissipation of energy from electric storage device 9. Hence, a smaller storage device is needed to ensure vehicle propulsion than might otherwise be required.

Referring to FIG. 3, power from M/G #1 also can be supplied mechanically to sun gear S4 by energizing clutch device 16. In this circumstance M/G #1 must function as a motor with clutch 14 de-energized such that no power is delivered from the engine. Such a vehicle condition as starting on a gradient where a high output torque is required would benefit from both motor generators combining their power. The engine 3 normally has a minimum speed, i.e., idle, below which it could stall. The mechanical power potential of the engine thus can be held in abeyance until the speed of sun gear S4 achieves at least the idle speed of the motor. At this point, clutch 14 can be re-energized such that engine power is added to that from M/G #1 and delivered to sun gear S4. That condition represents all three power generating devices i.e., 3, 4, and 6, acting in combination to propel the vehicle.

In a condition where devices 3, 4, 6 are all contributing mechanical energy, electric energy for both motor generator units 4, 6 is extracted from the on-vehicle electrical storage device 9. The vehicle likewise can be operated exclusively electrically for a period of time, i.e., with the engine not running. Such a condition is sustainable up to the capacity of the stored energy on-board the vehicle.

First range operation also can be achieved solely by operating M/G #1 as a motor, again utilizing the stored electric energy means. M/G #1 could provide mechanical power that causes M/G #2 to function as generator, but such operation is unsustainable and inefficient due to energy conversion losses, and is not recommended as a usual vehicle operating condition. Both motor generator units 4, 6 can be powered to propel the vehicle without energizing brake 50. However, that condition and the related condition above are not usual operating cases. These conditions might be representative of emergency or "limp home" capabilities in the event of component malfunction.

Referring to FIG. 3, a preferred operating condition is engine running and powering M/G#1 as a generator through clutch 14, with M/G #2 propelling the vehicle forward through its effect on ring gear R3. In that event, a condition can be achieved through selective gear ratios in planetary gear sets 32 and 40, at which the speed of sun gear S4 coincides with the speed of engine 3 as transferred to carrier C1 and clutch housing 20. At that point, clutch device 16 can be energized simultaneously with the de-energizing of brake device 50. Since the speeds of sun gear S4 and clutch housing 20 are identical in this condition, the engagement of clutch 16 is synchronous, i.e., no relative motion occurs between the facing clutch members. This engagement of clutch 16 with release of brake 50 constitutes a shift in ratio range from first range to a second range.

Execution of this shift has the effect of reversing the torque component at sun gear S3 from action to reaction. This torque reversal (at no speed change) instantly changes the function of M/G #2 from that of a motor to a generator. This can be mathematically verified by vector analysis by realizing that the torque reaction previously furnished by brake 50 has been replaced by a reaction torque at sun gear S3. By judicious selection of planetary gear ratio and power capacity of the engine and both motor/generator units, such a shift will not alter the absolute power at M/G #2, but rather reverse it. Shifting from first range to second range is step-less and without effect upon input power or output power. Such a condition is highly desirable for smooth vehicle operation and performance and is referred to as power match.

Figure 4:
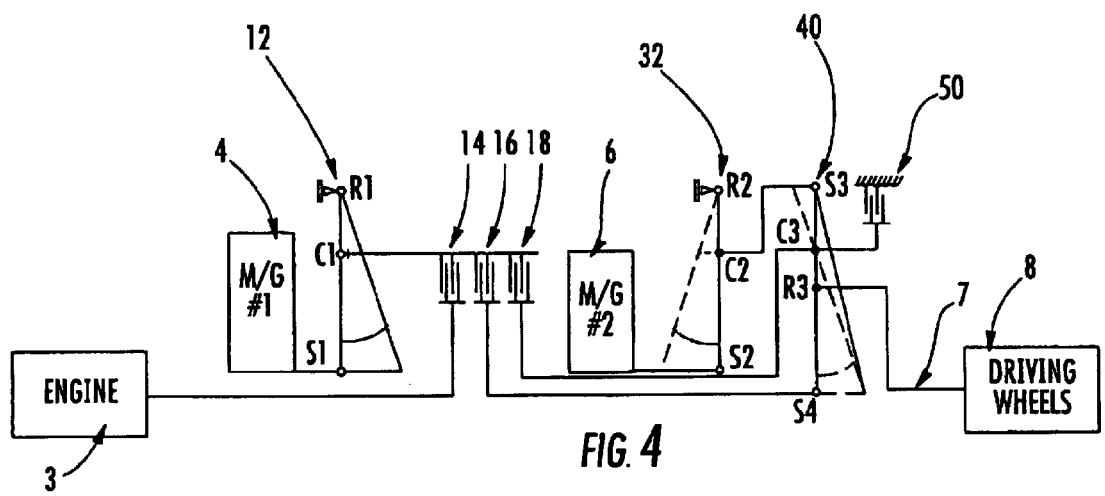

FIG. 4 illustrates the change in speed vectors, from the 1–2 shift point (shown as dashed lines) to approximately one half-way through the second ratio range. For simplicity of illustration, no changes are depicted for the engine or M/G #1, although it is recognized that their speeds may be altered by the vehicle operator's use of the vehicle controls. In the preferred mode of operation, both clutches 14 and 16 are energized and the resultant power from the engine and M/G #1 is delivered to sun gear S4. Coincidentally, the speed of M/G #2 is controlled to decrease its rotation from an anti-engine-wise direction to zero speed as shown by the vertical lever. This reduction in M/G #2 speed consequently reduces the C2 and S3 speed until their speeds are also zero. In such a case, M/G #2 is neither generating nor receiving power; although a torque reaction element remains to satisfy the load condition. With no power requirement at M/G #2, there is no power demand on M/G #1 needed to sustain vehicle propulsion (unless battery charging is required). Hence engine power is solely sufficient to propel the vehicle. Such a condition of only engine power often is one of the most overall efficient modes of operation. As the diagram of FIG. 4 also shows, the transmission output speed at ring gear R3, and the speed of carrier C3 have both increased from their initial values at the 1–2 shift point.

Figure 5:
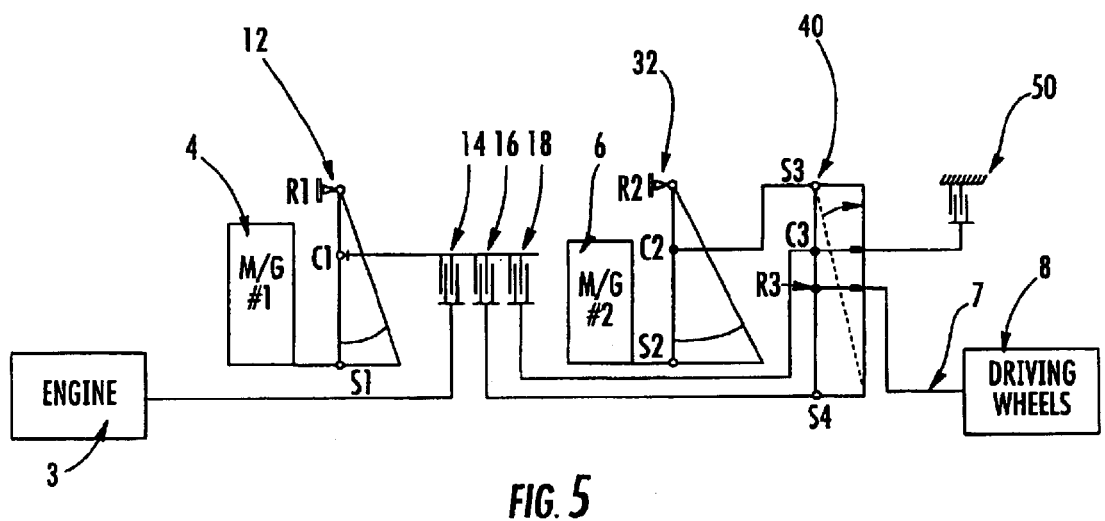

FIG. 5 shows the component speeds at their maximum extent in second range. To reach this condition, the speed of M/G #2 has increased in an engine-wise direction until the speeds of C2 and S3 are equal to the speed of sun gear S4. Consequently, and as described by the lever analogy, the speeds of carrier C3 and ring gear R3 are also equal to S3 and S4. This is described as a 1:1 ratio, and is the point at which a shift from the second range to the third range is executed. To achieve the condition as shown in FIG. 5, M/G #2 must again function as a motor in order to balance the torque and power equations of the lever. M/G #1 preferably is functioning as a generator, or may be load sharing with the engine.

It can be quickly realized from FIG. 5 that the speeds of all elements except sun gears S1 and S2; and ring gear R1 and R2 are identical in both magnitude and direction. This similarly applies to clutches 14, 16 and 18. Now, at the 2–3 shift point, clutch 16 is released simultaneously with the energizing of clutch 18. Coincidental with this 2–3 shift, the torque component at C2, S3 again reverses such that M/G #2 again changes from a motor to a generator. In essence, the torque component which is applied to S4 in second range is now released, and is compensated for by the torque component at C3 when in third range. By vector analysis, the load at ring gear R3 is a reaction, at C3 the load is an action, and at sun gear S3 the load is a reaction in order to balance the force diagram. An engine-wise speed direction with a reaction torque load thus produces a regenerative load upon M/G #2 and causes it to act as an electric generator. And again, as at the 1–2 shift point, all shifting component speeds were identical and the shift was synchronous. As previously discussed, if the ratios of the planetary gear sets were judiciously selected, the power transfer between components will be balanced and the 2–3 shift will be executed in seamless and step-less manner. As in first range, second range operation is also known as being independently driven by the changes in M/G #2 such that the ratio of transmission output speeds to engine input speed is continuously variable as a function of M/G #2 speed.

Figure 6:
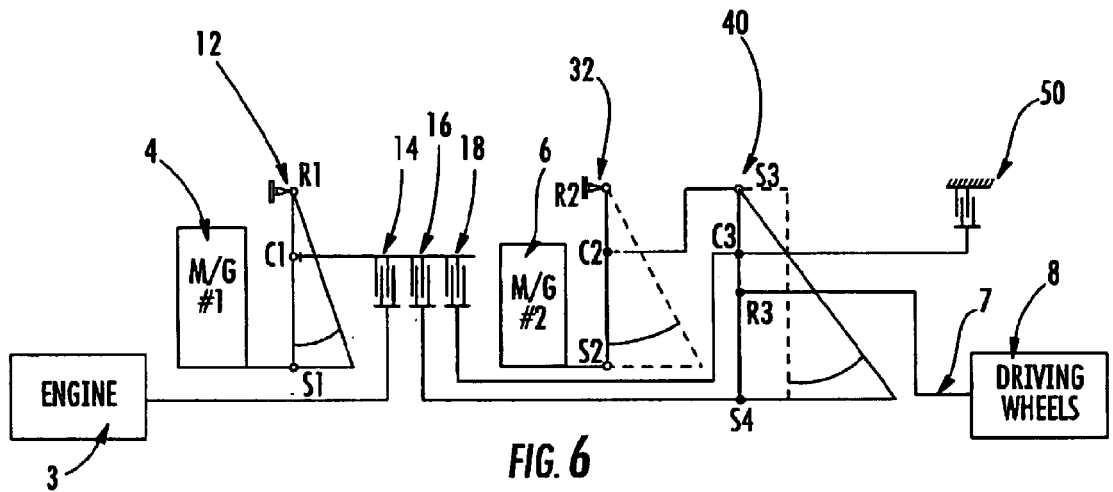

FIG. 6 is an exemplary illustration depicting the speed vector changes from the 2–3 shift point shown as dotted lines to the approximate one-half ratio range coverage of third range (shown as solid lines). In third range, the engine and M/G #1 are still connected through clutch 14. Their resultant power drives carrier C3 through clutch 18. Clutch 16 is released to allow sun gear S4 to spin freely. Output speed at ring gear R3 is increased by pivoting the lever representing planetary gear set 40 anti-clockwise about the vector of carrier C3. Such anti-clockwise rotation is achieved by reducing the speed of M/G #2 from its value at the 2–3 shift point to zero speed as represented by the vertical lever of planetary gear set 40 in FIG. 6. The speed of ring gear R3, and hence transmission output shaft 7, is greater than the engine input speed. This represents an overdrive condition. As revealed previously in the discussion of FIG. 4, the circumstance wherein M/G 2 ceases rotation, and hence power consumption, represents a possibility for sole propulsion by the engine 3, without recourse to any electric energy. Such a condition may similarly be efficient and energy effective.

Figure 7:
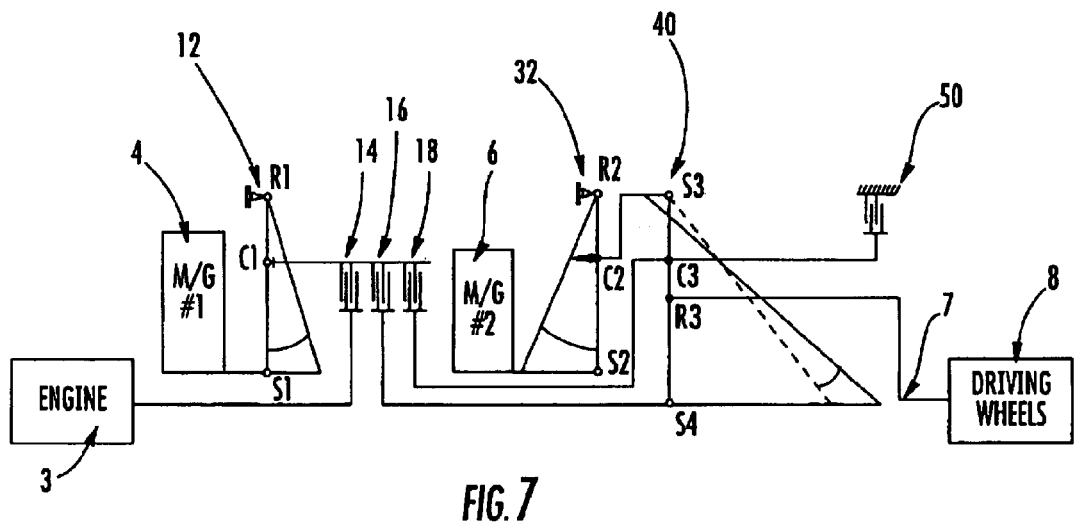

Now turning to FIG. 7, there is shown a diagram wherein M/G #2 has increased its rotation in an anti-input-wise direction. This produces the effect of also rotating C2, S3 in an anti-input-wise direction which causes the lever representing the Ravigneaux gear set to continue its anti-clockwise rotation about the vector of carrier C3. As a result, ring gear R3 increases its speed even further; as does the sun gear S4. The circumstance represented by FIG. 7 represents the maximum potential transmission output speed as a function of engine input speed and M/G #1 speed as transferred through clutch 18, and as the maximum anti-input-wise speed potential of M/G #2. Third ratio range operation—as highlighted in the discussion of first and second range operation—is continuously variable as a function of M/G #2 speed.

To summarize, forward vehicle propulsion has been shown to be achieved by changing the direction of rotation of M/G #2 in concert with the rational combination of engine and M/G #1 input to achieve three continuous, synchronous ratio ranges from a low limit of zero speed (but finite torque capacity) to a predetermined overdrive ratio, the shifting between ranges being step-less with no interruption in input (engine) power or output power. And, in addition, a high capacity output power can be achieved by combining one or both motor/generator units with the engine to facilitate grade-ability requirements or high starting load conditions.

Figure 8:
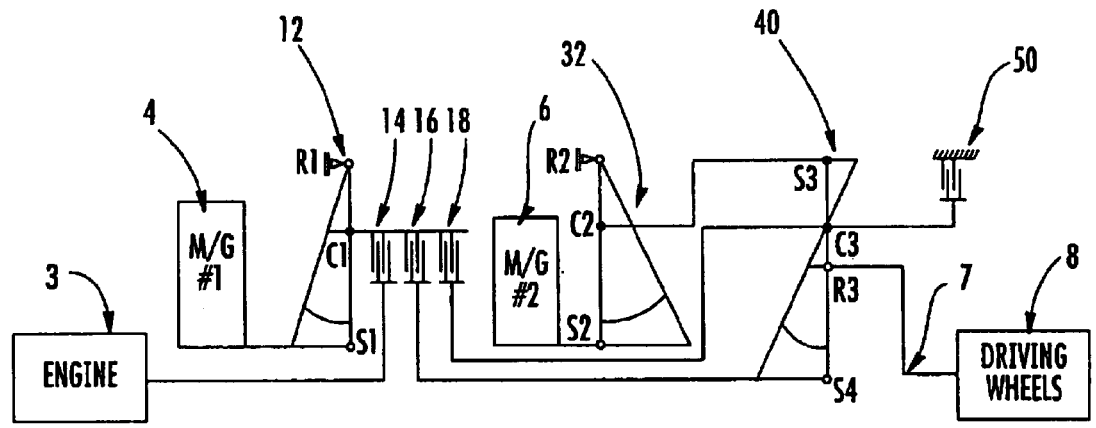

Similar to the first ratio range operation as previously described, a reverse vehicle operating function is also achieved. Reverse operation is schematically represented by FIG. 8. In this condition, clutches 14, 16 and 18 are de-energized while brake 50 is energized such that carrier C3 of planetary gear set 40 is inhibited from rotating. M/G #2, functioning as a motor, operates with an engine-wise rotation such that carrier C2 and sun gear S3 also rotate in an engine-wise direction. This causes the lever representation of planetary gear set 40 to rotate clockwise about the fixed pivot of carrier C3. As thus depicted in FIG. 8, ring gear R3 and sun gear S4 rotate in an anti-engine-wise direction. This reverse direction of rotation with ring gear R3 directly connected to transmission output shaft 7 and hence the drive train 8 of the vehicle, will propel the vehicle in a reverse direction. The extent of such movement is determined by operation of M/G #2 and thus is continuously variable with respect to the input parameters of the engine 3.

Again referring to FIG. 8, and as previously mentioned, M/G #1 may also function as motor to assist in propelling the vehicle in reverse. To achieve this condition, M/G #1 is operated in an anti-engine-wise direction with clutch 16 energized. Thus, power from M/G #1 is delivered to sun gear S4 such that its energy supplements, and is additive to, that delivered by M/G #2. A vehicle condition which requires increased reverse capability—such as backing up a hill—benefits from utilizing both M/G #1 and M/G #2 as motors in this mode. However, the duration of such operation is limited by the capacity of the on-board electrical storage system. It should also be noted the engine power as delivered through clutch 14 cannot be utilized due to the opposite rotation of M/G #1.

Figure 9A:
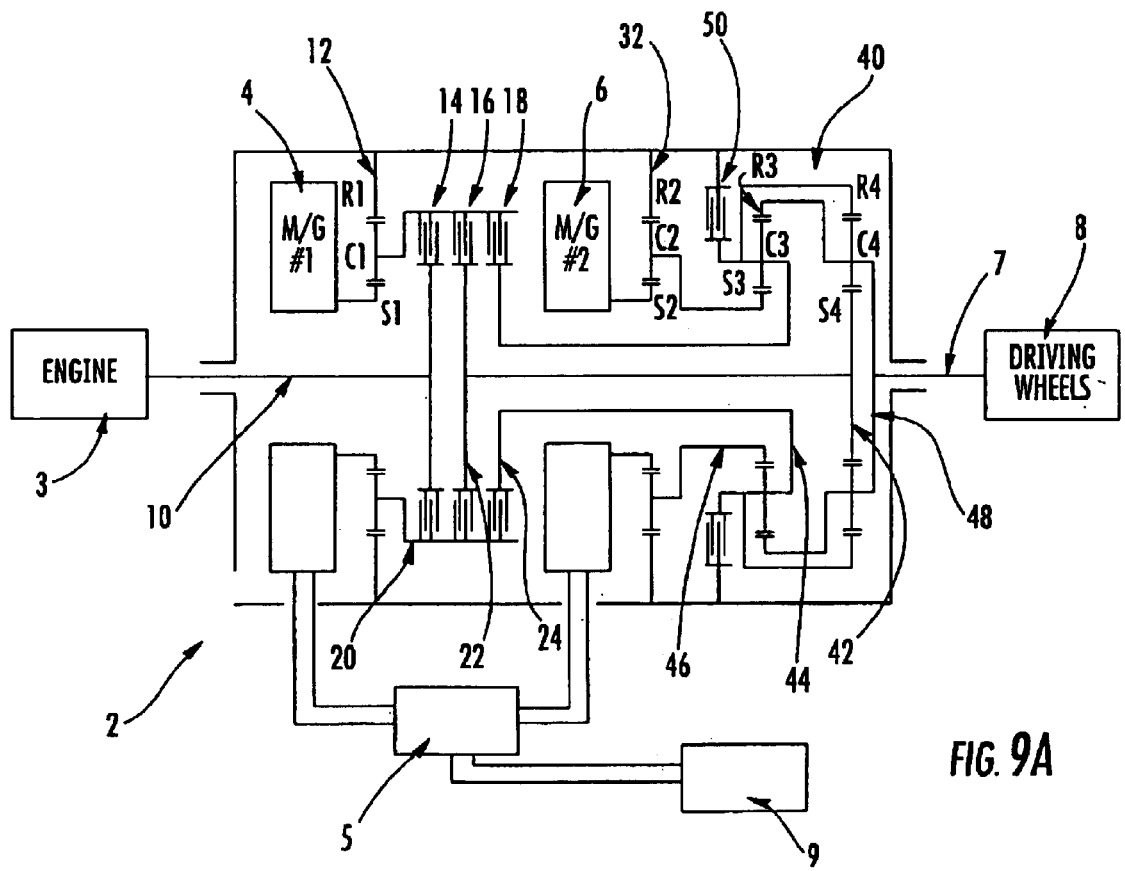
FIGS. 9a, 9b are schematic diagrams of alternative parallel-hybrid planetary gear set configurations embodiments of the present invention.
Figure 9B:
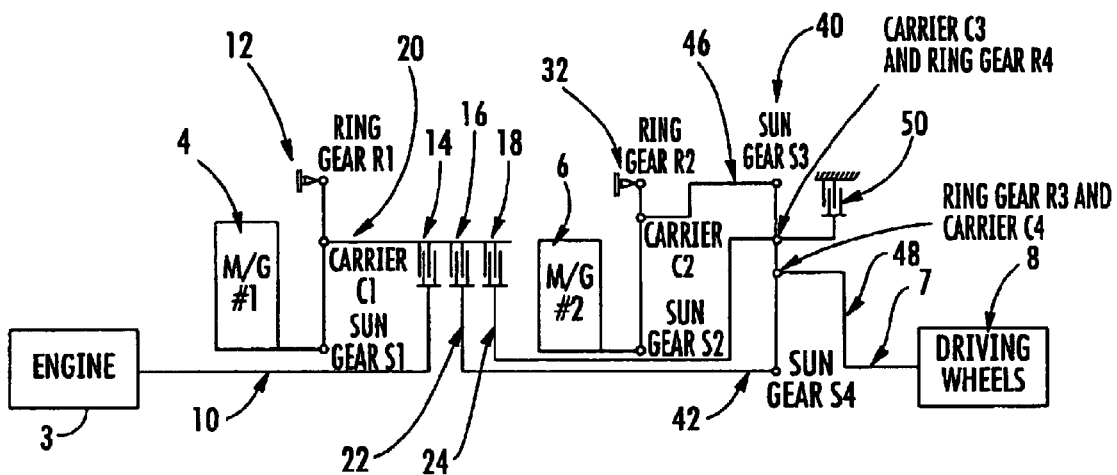

FIG. 9a illustrates in a schematic diagram an alternative embodiment of the invention, which differs from the embodiment of FIG. 1a in that the combining gear set 40 is arranged in a "simple-compound" configuration, whereas gear set 40 in FIG. 1a is arranged as a Ravigneaux gear set. FIG. 9b illustrates the appropriate lever analogy diagram wherein the two separate planetary gear sets which comprised the "simple-compound" configuration are combined in a single lever with the appropriate connections to the other features of the transmission.

The operations of the transmission embodiment of FIG. 9a in three forward ratio ranges and one reverse ratio range with synchronous shifting between the power input devices are as described with respect to transmission 2 of FIG. 1a.

The invention having been described in connection with representative examples, variations from the examples within the scope of the invention will occur to those skilled in the art. The invention is intended to encompass not only the examples, but also the reasonable scope legal scope of equivalents. Reference should be made to the appended claims as opposed to the discussion of examples, in order to assess the scope of the invention in which exclusive rights are claimed.

What is claimed is:

1. A power transmission apparatus comprising:
   an input rotational coupling to which power can be applied from a prime mover and an output rotational coupling by which power can be applied to a load;
   at least two electric machines, one of the electric machines connectable to one of the input rotational coupling and the output rotational coupling by independently controllable clutch devices, each of the electric machines being independently operable as a motor and as a generator;
   an electric energy storage device coupled to the electric machines through a controller and operable to store and release electric energy;
   first and second planetary gear sets respectively coupled to the electric machines;
   a third planetary gear set having at least two sun gears, coupled to the output rotational coupling;
   wherein the controller is coupled to operate the clutch devices and the electric machines in coordination so to obtain a plurality of operational ranges, the ranges differing by routing different subsets of input mechanical and electric power from the prime mover and the energy storage device into charging of the energy storage device and application of power to the output rotational coupling, and one of the two sun gears of the third planetary gear set is coupleable a respective one of the independently controllable clutch devices to a planetary gear carrier of the first and second planetary gear sets.

2. The power transmission apparatus of claim 1, wherein the input rotational coupling has a normal engine-wise rotational direction for advancing in a given direction, and wherein at least one of said electric machines is movable in the engine-wise direction and in an anti-engine-wise direction during different operational conditions of the apparatus.

3. The power transmission apparatus of claim 1, wherein the electric machines comprise first and second motor/generators.

4. The power transmission apparatus of claim 1, wherein the third planetary gear set comprises one of a Ravigneaux gear set, a simple-compound gear set configuration, and a plural stage gear set.

5. The power transmission apparatus of claim 4, wherein the independently controllable clutch devices selectively connect the first planetary gear set to at least one of the input rotational coupling, one of the sun gears of the third planetary gear arrangement and a planetary carrier of said third planetary gear arrangement.

6. The power transmission apparatus of claim 3, further comprising at least one controllable brake operable to fix an element of the third planetary gear set in at least one operational mode of the transmission.

7. The power transmission apparatus of claim 6, wherein the controller is operable for selectively operating the clutch devices and the brake in a plurality of operational modes including:
   coupling one of the motor/generators to the input coupling during operation of the prime mover, and operating one of the motor/generators as a generator for at least one of charging the energy storage device and providing electric power to an other of the motor/generators;
   coupling at least one of the motor/generators as a motor to the output coupling for operation as a motor adding output power in addition to power from the prime mover under electric power from at least one of the energy storage device and an output of an other of the motor/generators;
   coupling power from the prime mover to the output coupling exclusive of the motor/generators; and
   coupling the output coupling to at least one of the motor/generators for operation as a generator during regenerative braking.

8. The power transmission apparatus of claim 7, wherein the operational modes further comprise at least one of:
   coupling one of the motor/generators to the input coupling during forward operation as a motor powered from the energy storage device, for starting the prime mover;
   coupling one or both of the motor/generators to the output coupling exclusive of the input shaft, for high torque/low speed operation as a motor powered from the energy storage device;
   coupling the motor/generators for operation in opposite rotational directions;
   coupling at least one of the motor/generators to the output coupling for operation in reverse.

9. The power transmission apparatus of claim 7, wherein the controller is arranged to shift from one of said operational modes to another in effecting at least one shift for changing at least one of a torque/speed ratio and a charging/discharging condition among the motor/generators and the energy storage device.

10. The power transmission apparatus of claim 7, wherein the controller is arranged to effect said shift during one of no-load and synchronous operation of elements of the clutch devices.

11. A vehicle comprising:
   an engine; and
   a hybrid transmission coupled to the engine, the hybrid transmission comprising:
      an input rotational coupling to which power can be applied from the engine and an output rotational coupling by which power can be applied to a load;

at least two electric machines, one of the electric machines connectable to one of the input rotational coupling and the output rotational coupling by independently controllable clutch devices, each of the electric machines being independently operable as a motor and as a generator;

an electric energy storage device coupled to the electric machines through a controller and operable to store and release electric energy;

first and second planetary gear sets respectively coupled to the electric machines;

a third planetary gear set having at least two sun gears, coupled to the output rotational coupling;

wherein the controller is coupled to operate the clutch devices and the electric machines in coordination so to obtain a plurality of operational ranges, the ranges differing by routing different subsets of input mechanical and electric power from the engine and the energy storage device into charging of the energy storage device and application of power to the output rotational coupling, and one of the two sun-gears of the third planetary gear set is coupleable by a respective one of the independently controllable clutch devices to a planetary gear carrier of the first and second planetary gear sets.

12. The vehicle of claim 11, wherein the transmission has an engine-wise direction corresponding to operation of the engine and wherein at least one of the electric machines is movable in an anti-engine-wise direction during the operational ranges of the transmission.

13. The vehicle of claim 11, wherein the third planetary gear set comprises one of a of a Ravigneaux gear set with plural sun gears and a simple-compound gear set configuration.

14. The vehicle of claim 11, wherein the engine, the input rotational coupling, the output rotational coupling, the electric machines and the first and second planetary gear sets are coaxially aligned.

\* \* \* \* \*